United States Patent [19]
Kivioja et al.

[11] Patent Number: 5,865,716
[45] Date of Patent: Feb. 2, 1999

[54] METHOD AND APPARATUS FOR REGULATING THE TEMPERATURE IN END AREAS OF A ROLL MANTLE OF A VARIABLE-CROWN ROLL HAVING GLIDE BEARINGS

[75] Inventors: Pekka Kivioja, Muurame; Esa Lensu, Iyväskylä, both of Finland

[73] Assignee: Valmet Corporation, Helsinki, Finland

[21] Appl. No.: 733,250

[22] Filed: Oct. 18, 1996

[30] Foreign Application Priority Data

Oct. 23, 1995 [FI] Finland ................................... 955041

[51] Int. Cl.⁶ ..................................... D21G 1/02
[52] U.S. Cl. .................... 492/7; 492/16; 492/20
[58] Field of Search ................. 492/7, 20, 16, 492/5

[56] References Cited

U.S. PATENT DOCUMENTS

| | | | |
|---|---|---|---|
| 4,729,153 | 3/1988 | Pav et al. | 29/116 AD |
| 5,060,357 | 10/1991 | Roerig et al. | 29/113.2 |
| 5,111,563 | 5/1992 | Brown et al. | 29/116.2 |
| 5,509,883 | 4/1996 | Niskanen et al. | 492/20 |

FOREIGN PATENT DOCUMENTS

| | | |
|---|---|---|
| 0332594 | 12/1993 | European Pat. Off. . |
| 0672786 | 9/1995 | European Pat. Off. . |
| 944272 | of 0000 | Finland . |
| 950814 | of 0000 | Finland . |
| 80334 | 11/1986 | Finland . |
| 93042 | 12/1993 | Finland . |

OTHER PUBLICATIONS

Abstract and Translation of Claims 1 and 2 of Finnish Patent Application No. 935165 filed Nov. 22, 1993.

*Primary Examiner*—I. Cuda
*Attorney, Agent, or Firm*—Steinberg & Raskin, P.C.

[57] ABSTRACT

A method and apparatus for regulating the temperature in end areas of a roll mantle of a variable-crown roll provided with glide bearings and/or for compensating for an error in the diameter of the roll arising from thermal expansion. The roll mantle of the roll is supported adjustably on the roll axle by hydraulic loading elements loaded by a pressure medium and acting upon the inner face of the roll mantle at least in the direction of the nip plane. Further, the roll mantle is supported on the roll axle by hydraulic glide-bearing elements loaded by a pressure medium and arranged in the areas of the ends of the roll mantle. A fluid is supplied into the end areas of the roll and has a regulated temperature and/or flow so that it is possible to keep the temperature in the end areas of the roll mantle at a desired level, for example, substantially at the same level as the temperature in the middle area of the roll.

32 Claims, 6 Drawing Sheets

METHOD AND APPARATUS FOR REGULATING THE TEMPERATURE IN END AREAS OF A ROLL MANTLE OF A VARIABLE-CROWN ROLL HAVING GLIDE BEARINGS

FIELD OF THE INVENTION

The invention relates to a method and apparatus for regulating the temperature in end areas of a roll mantle of a variable-crown roll provided with glide bearings and/or for compensating any errors or deviations in the diameter of the roll arising from thermal expansion of a roll. The roll mantle is supported adjustably on a roll axle by means of hydraulic loading elements loaded by means of a pressure medium and which are oriented to act upon the inner face of the roll mantle at least in the direction of the nip plane. The roll mantle is also supported on the roll axle by means of hydraulic glide-bearing elements loaded by means of a pressure medium and arranged in the areas of the ends of the roll mantle.

BACKGROUND OF THE INVENTION

Variable-crown rolls are needed and used in paper machines, for example, in presses and in calenders, and, further, such rolls are used in paper finishing devices, such as supercalenders. Thus, it is almost an essential feature of such variable-crown rolls that the roll forms a nip with a backup roll whereby a paper web is passed through the nip, e.g., to be dewatered. The roll is provided with necessary crown variation means, by whose means the roll mantle is loaded in the direction of the nip plane and by whose means the nip profile is controlled.

In the past, it was the most common construction in variable-crown rolls to mount the tubular roll mantle of the roll from its ends on the roll axle by means of roller bearings. Such a conventional mode of journalling also had its advantages, for example, the journalling can be accomplished in a rather simple manner and so far the cost of this construction has been considered to be relatively reasonable. Such a conventional mode of journalling, in which the roll mantle is mounted from its ends stationarily on the axle, is however not totally suitable for even nearly all applications in paper machines. From variable-crown rolls which are in nip contact with a backup roll, quite often such a property is required that the roll mantle must be able to move in the radial direction in relation to the roll axle. In view of regulating the profile of linear load across the entire axial length of the roll, the roll ends must also be able to move in the radial direction in relation to the axle. For this reason, rolls have been developed in which this property has been accomplished so that the end bearings of the roll mantle have been mounted on separate annular parts, which can move radially in relation to the roll axle. One such roll is described, for example, in European Patent No. 0,332,594.

Mounting of a roll by means of roller bearings has, however, caused a number of drawbacks and problems for the manufacture and operation of the roll. These drawbacks include the numerous machinings required by the roller bearings, the problems arising from wear of the bearings, limitations imposed by the roller bearings in respect of the oil used in the roll, limitations on the web running speeds with roller bearings, and accuracy of rolling of the bearings. For these reasons, there has been a desire to abandon the roller bearings, and in recent years variable-crown rolls have been developed in which the journalling of the roll mantle has been accomplished by means of glide bearings. Such rolls with glide bearings have been described, for example, in the U.S. Pat. Nos. 5,060,357 and 5,111,563 and in Finnish Patent Application Nos. 941107 (which corresponds to U.S. Pat. No. 5,509,883, the entire disclosure of which is incorporated by reference herein), 941991, 944272 and 950814 (which corresponds to U.S. patent application Ser. No. 08/411,439, the entire disclosure of which is incorporated by reference herein). It is however a problem in rolls with glide bearings that the end areas of the roll may be heated excessively, which has a highly detrimental effect on the nip profile. Heating of the end areas is, of course, a problem also in variable-crown rolls of other types which form a nip with a backup roll through which a fibrous web runs. One important factor in the excessive heating of the end areas is, among other things, the fact that in the middle area of the roll the heat can be conducted away from the roll through the paper web which runs over the middle area of the roll, whereas the ends are heated, because the web is often substantially narrower than the roll mantle. Thus, there is no medium such as a moving web to convey heat from the ends of the roll.

In a roll with glide bearings, the risk of heating of the end areas can be even higher because the generation of heat in a glide bearing is higher than in a roller bearing. The generation of heat in the ends in a roll with glide bearings is a particular problem also because several glide bearing elements are effective at the same location on the inner circumference of the roll mantle. Part of the heat that is generated is, of course, carried away from the areas of the ends along with the oil flowing through the glide bearing, but in normal cases the quantity of oil is not sufficiently large to carry away the required quantity of heat.

OBJECTS AND SUMMARY OF THE INVENTION

Accordingly, it is an object of the present invention to provide a novel method by whose means an excessive generation of heat in the end areas of a roll provided with glide bearings and the problems arising from such generation of heat are avoided.

It is another object of the present invention to provide a new and improved method and apparatus for regulating the temperature in end areas of a roll mantle of a variable-crown roll provided with glide bearings and/or for compensating for any errors or deviations in the diameter of the roll arising from thermal expansion of a roll.

It is yet another object of the present invention to provide a new and improved method and apparatus for operating a variable-crown roll in which the drawbacks of prior art constructions are substantially eliminated.

In view of achieving these objects and others, in the method in accordance with the invention, a pressure medium is supplied into end areas of the variable-crown roll which has a temperature and/or flow regulated so as to keep the temperature in the end areas of the roll mantle at the desired level, for example, substantially at the same level as the temperature in the middle area of the roll.

The advantages provided by means of the present invention over the prior art constructions are based on the fact that the heating of the end areas of the roll mantle can be brought under adequate and dedicated control. As a result of this control, the axial temperature profile of the roll does not distort the nip profile.

More specifically, in the method for regulating the temperature in end areas of a roll mantle of a variable-crown roll provided with glide bearings and/or for compensating for an error in the diameter of the roll arising from thermal expansion in a roll, the roll includes a roll axle, hydraulic loading elements mounted on the roll axle for adjustably supporting the roll mantle on the roll axle and hydraulic glide bearing elements mounted on the roll axle for supporting the roll mantle on the roll axle. The hydraulic loading elements act on an inner face of the roll mantle under hydraulic pressure provided by a pressure medium, and are typically arranged in a middle area of the roll mantle, and the hydraulic glide bearing elements act on the inner face of the roll mantle and are arranged in end areas of the roll mantle. In accordance with the invention, a fluid is supplied into end areas of the roll between the roll axle and the roll mantle, the fluid being capable of having a different temperature and/or flow than the pressure medium for the hydraulic loading elements, and the temperature and/or flow of the fluid being supplied into the end areas of the roll is/are regulated such that the temperature in the end areas of the roll mantle is set at a desired level, e.g., such that the temperature in the end areas of the roll mantle is substantially the same as the temperature in a middle area of the roll between the end areas of the roll. When the roll forms a nip with another press roll, the hydraulic loading elements are specifically arranged to act in a direction of a nip plane defined as a plane extending between a center axis of the roll and a center axis of the press roll and through the nip. To supply the fluid into the end areas of the roll, it is possible to direct the fluid into the glide bearing elements arranged in the end areas of the roll mantle whereby the fluid acts as a pressure medium for the glide bearing elements and the fluid passes from the glide bearing elements into a space between the roll axle and the roll mantle in the end areas of the roll such that it produces hydraulic loading of the glide bearing elements or, in the alternative, pass the fluid directly from a source thereof into the end areas of the roll between the roll axle and the roll mantle to act directly upon the inner face of the roll mantle. In this latter case, the glide bearing elements are connected to a pressure medium supply system. The temperature of the fluid supplied to the end areas of the roll can be determined in accordance with the running speed and loading situation of the roll and possibly regulated as stepwise variable based on the running speed of the roll.

To provide the actual regulation of the temperature of the fluid, the fluid is passed through a heat exchanger before it is supplied to the end areas of the roll while to provide the actual regulation of the flow of the fluid, it is passed through a flow regulator prior to being supplied to the end areas of the roll.

In the apparatus for regulating the temperature in end areas of a roll mantle of a variable-crown roll provided with glide bearings and/or for compensating for an error in the diameter of the roll arising from thermal expansion in a roll, the roll includes a roll axle, hydraulic loading elements mounted on the roll axle for adjustably supporting the roll mantle on the roll axle and hydraulic glide bearing elements mounted on the roll axle for supporting the roll mantle on the roll axle. In accordance with the invention, the apparatus includes supply means for supplying a fluid into end areas of the roll between the roll axle and the roll mantle, which may be distinct from the pressure medium being passed to the hydraulic loading elements, and regulating means coupled to the supply means for regulating the temperature and/or flow of the fluid being supplied into the end areas of the roll such that the temperature in the end areas of the roll mantle is set at a desired level.

Additional advantages and characteristic features of the invention will come out from the following detailed description of the invention.

BRIEF DESCRIPTION OF THE DRAWINGS

The following drawings are illustrative of embodiments of the invention and are not meant to limit the scope of the invention as encompassed by the claims.

DETAILED DESCRIPTION OF THE PREFERRED EMBODIMENTS

Figure 1:
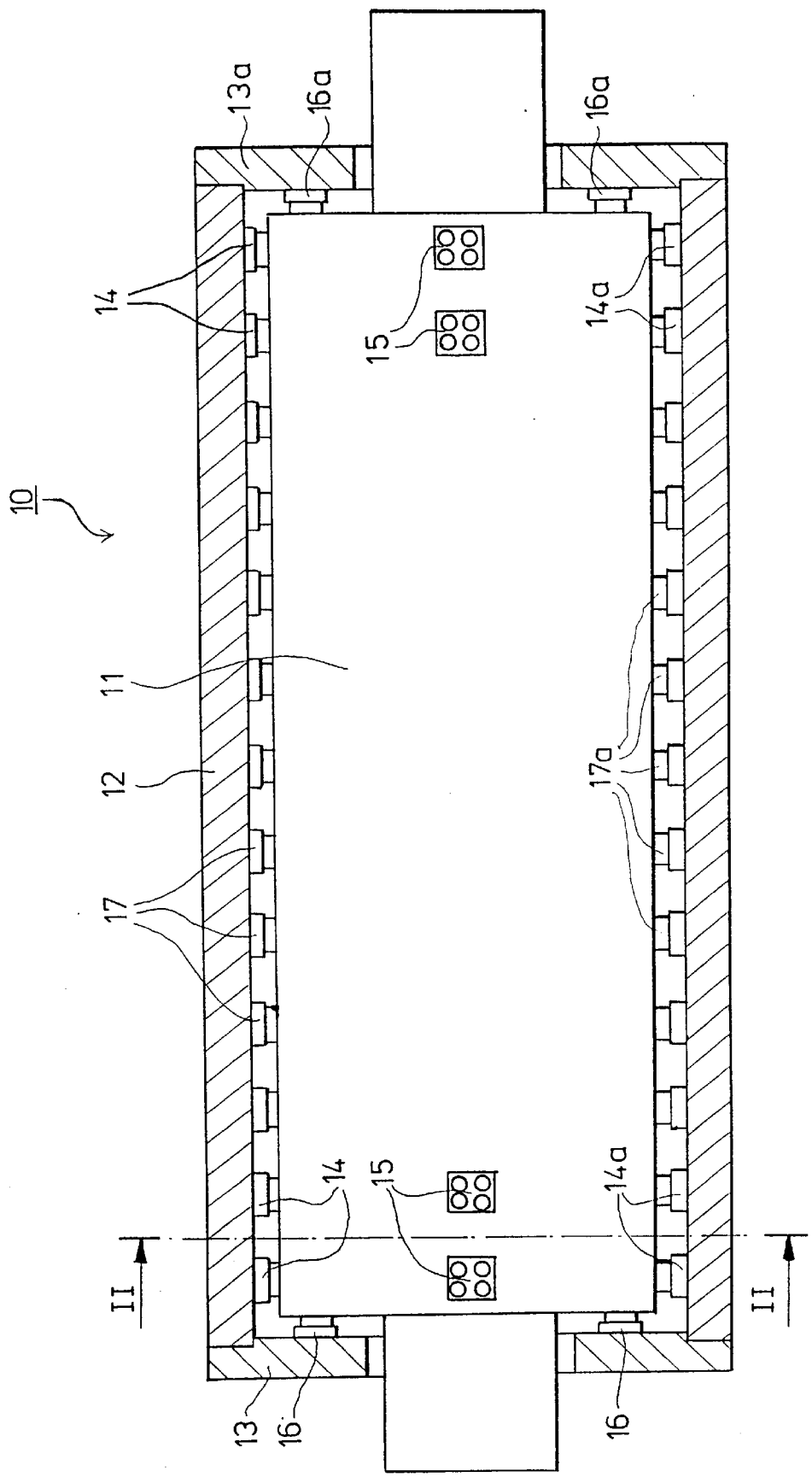
FIG. 1 is a fully schematic sectional side view of a roll provided with glide bearings to which the method of the present invention can be applied.
Figure 2:
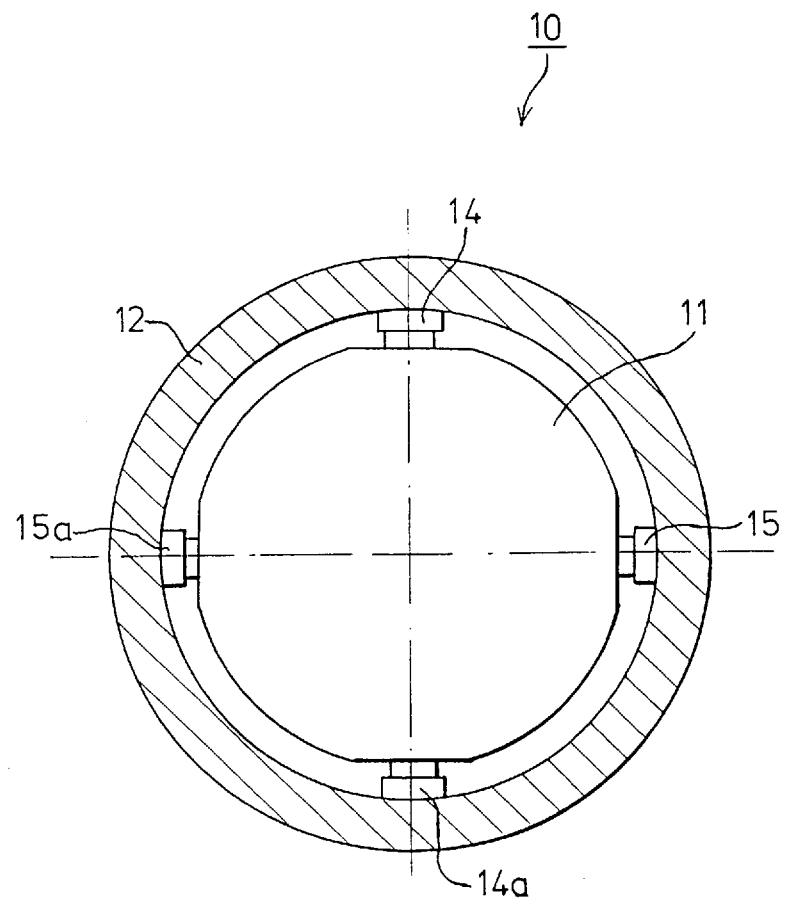
FIG. 2 is a schematic sectional view taken along the line II—II in FIG. 1.

Referring to the accompanying drawings wherein the same reference numerals refer to the same or similar elements, FIGS. 1 and 2 are fully schematic sectional views of a tubular roll provided with glide bearings wherein FIG. 1 is a sectional view of the roll taken in the axial vertical plane, and FIG. 2 is a sectional view of the roll of FIG. 1 taken along the line II—II. In FIGS. 1 and 2, the roll is denoted generally by reference numeral 10. The roll 10 is a variable-crown roll which comprises a stationary roll axle 11, a tubular roll mantle 12 mounted to revolve or rotate about the roll axle 11 and support means for supporting the mantle 12 on the roll axle 11, such as a first set of hydraulic loading elements 17 extending across a significant portion of the axial length of the roll 10 and acting in one direction and a second set of hydraulic loading elements 17a extending across a significant portion of the axial length of the roll 10 and acting in the opposite direction. In the exemplifying embodiment shown in FIG. 1, the hydraulic loading elements 17,17a act in the direction of the nip plane, i.e., the plane extending through the nip and the center of the roll 10, and it is possible to regulate the shape of the roll mantle 12 and control the axial nip profile of the roll by means of the hydraulic loading elements 17,17a.

As shown in FIGS. 1 and 2, the roll 10 is a roll mounted exclusively by means of glide bearings, so that the roll 10 has no conventional roller bearings arranged at the roll ends at all. The journalling of the roll 10 has been accomplished by means of glide bearing elements, of which the glide bearing elements acting in the loading direction, i.e., in the direction of the nip plane in the case of the roll as shown in FIGS. 1 and 2, are denoted by the reference numerals 14 and 14a. The first glide bearing elements 14, of which there are two situated alongside one another, act in the direction of the nip, i.e. against the load, and the second glide bearing elements 14a, of which there are also two situated alongside one another, in the opposite direction. In the exemplifying embodiment shown in FIGS. 1 and 2, it is shown further that the roll 10 is also provided with two pair of glide bearing elements 15,15a acting in opposite directions transverse to the loading direction. As stated above, the roll 10 is a roll exclusively provided with glide bearings, so that it is also provided with glide bearing elements 16,16a acting in opposite directions in the axial direction, which elements 16,16a are supported against roll ends 13,13a by the intermediate of oil films. As shown in FIGS. 1 and 2, the glide bearing elements 14,15,14a,15a are supported in the radial direction against the inner face of the roll mantle 12 by means of oil films. In the construction shown in FIG. 1, the glide bearing elements 14,14a,15,15a that act in the radial direction are arranged in aligned pairs, so that there are two of each of the glide bearing elements, arranged side by side in the axial direction, and glide bearing elements 14,14a being arranged possibly in a row with the hydraulic loading elements 17. The operation of the roll 10 does, however, not necessarily require such an arrangement, for the journalling can also be accomplished by means of single glide bearing elements alone. Such constructions are described in more detail with respect to the embodiments shown in FIGS. 3–5.

FIG. 2 shows an embodiment in which the glide bearing elements 14,14a,15,15a are arranged to act in the direction of the primary loading plane and in the direction transverse to this loading plane. However, glide bearing elements can also be arranged radially in positions different from FIG. 2, in which case their number can also be different from that shown in FIG. 2 (see, e.g., FIG. 4 of FI 950814). Regarding the glide bearing elements 16,16a acting in the axial direction, it can be stated that, differing from FIG. 1, the axial movements of the roll mantle 12 can be controlled by means of just one set of glide bearing elements 16,16a acting in the same plane in opposite directions. On the other hand, there may be a greater number of these axial glide bearing elements 16,16a, which can be arranged, for example, as uniformly spaced in relation to one another, to act upon the inner faces of the roll ends 13,13a. The description given above with respect to the embodiments shown in FIGS. 1 and 2 is mostly concerned with the general construction of a roll with glide bearings.

Figure 3:
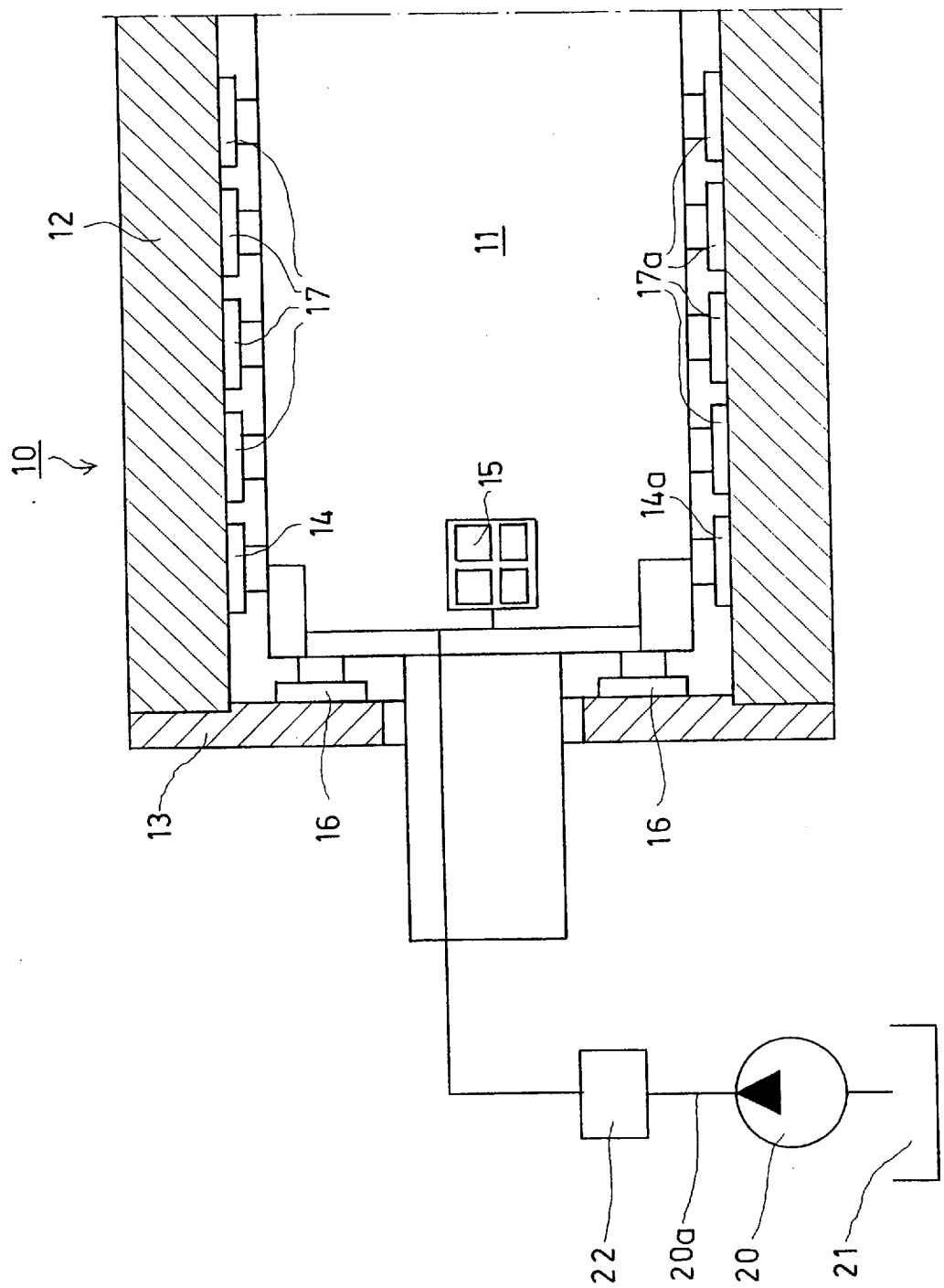
FIG. 3 is a schematic longitudinal sectional view of one end area of a roll with glide bearings and of a first embodiment in which the method in accordance with the invention can be applied.

FIG. 3 illustrates a first embodiment of a roll in which the method in accordance with the invention can be applied. With respect to the general construction of the roll 10, reference is made to the description related to FIG. 1, and in this respect, in FIG. 3, reference denotations corresponding to FIG. 1 have been used to denote the same or similar elements. However, the embodiment shown in FIG. 3 differs from the embodiment shown in FIG. 1 in the respect that while glide bearing elements arranged in pairs were employed in the roll 10 of FIG. 1, in the embodiment shown in FIG. 3, these elements have been substituted for by single glide bearing elements 14,14a,15 arranged in one row (about the circumference of the roll axle 11).

The construction shown in FIG. 3 can, of course, also be applied in connection with a roll as shown in FIG. 1. In FIG. 3, the regulation of the temperatures in the end areas of the roll mantle 12 is arranged through the installation of supply means 20,21 which supply pressure fluid only to the glide bearing elements 14,14a,15,16 acting radially and/or axially at the roll ends and this supply of pressure fluid is entirely separate from pressure fluid supply of the hydraulic elements 17,17a of the roll 10. The supply means comprise a pressure fluid reservoir or pressure fluid storage means 21 and pump means 20 operatively coupled to the pressure fluid storage means 21 for pumping pressure fluid through a feed duct 20a arranged in association with the pump means 20. A regulation device 22 is arranged in association with the feed duct 20a in order to control the supply of the pressure fluid. The regulation device 22 can be a device that regulates only temperature of a substance (a heat exchanger or a device connected with a heat exchanger), in which case the regulation device 22 regulates the temperature of the pressure fluid supplied to the glide bearing elements 14,14a,15, 16 to the desired level. In this case, the volumetric flow of the pressure fluid is substantially constant so that the temperature control is the only control parameter. Normally this desired level of the temperature of the pressure fluid fed to the glide bearing elements 14,14a,15,16 is lower than the temperature of the pressure fluid passed to the hydraulic loading elements 17,17a. The temperature of the pressure fluid passed to the glide bearing elements 14,14a,15,16 is defined or selected in accordance with the running speed and the loading situation. Sufficient accuracy can be achieved if the temperature is defined as stepwise variable based on the running speed of the roll, i.e., the temperature to which the pressure fluid is regulated changes along with changes in the running speed at certain defined steps or limits.

On the other hand, the arrangement in accordance with FIG. 3 can be arranged so that the regulation device 22 is a flow regulator, by whose means the volumetric flow of the pressure fluid fed to the glide bearing elements 14,14a,15,16 is regulated. In this case, the temperature of the pressure fluid is substantially constant so that the only control parameter is the volumetric flow. In practice this means that the volumetric flow is adjusted to a higher level ("additional fluid" is fed to the glide bearing elements 14,14a,15,16), in which case this larger flow equalizes the temperature of the roll. In such a case, the temperature of the pressure fluid fed to the glide bearing elements can be the same as the temperature of the pressure fluid passed to the hydraulic loading elements 17,17a. The supply of additional fluid can be arranged through the separate line shown in FIG. 3 leading from the regulation device 22 to each of the glide bearing elements 14,14a,15,16, or the supply of additional fluid can be arranged, for example, so that, as the glide bearing elements 14,14a,15,16, shoes with invariable fluid flow of the sort described in Finnish Patent Application No. 935165 are used. By means of such a shoe with invariable fluid flow, the volumetric flow of the pressure fluid passing through the shoe can be regulated in the desired manner. Further, in the embodiment of FIG. 3, it is possible to use a combination in which the temperature of the pressure fluid is regulated by means of a regulation device 22, and the volumetric flow of the pressure fluid is regulated by means of the shoes with invariable fluid flow employed as the glide bearing elements 14,14a,15,16.

Figure 4:
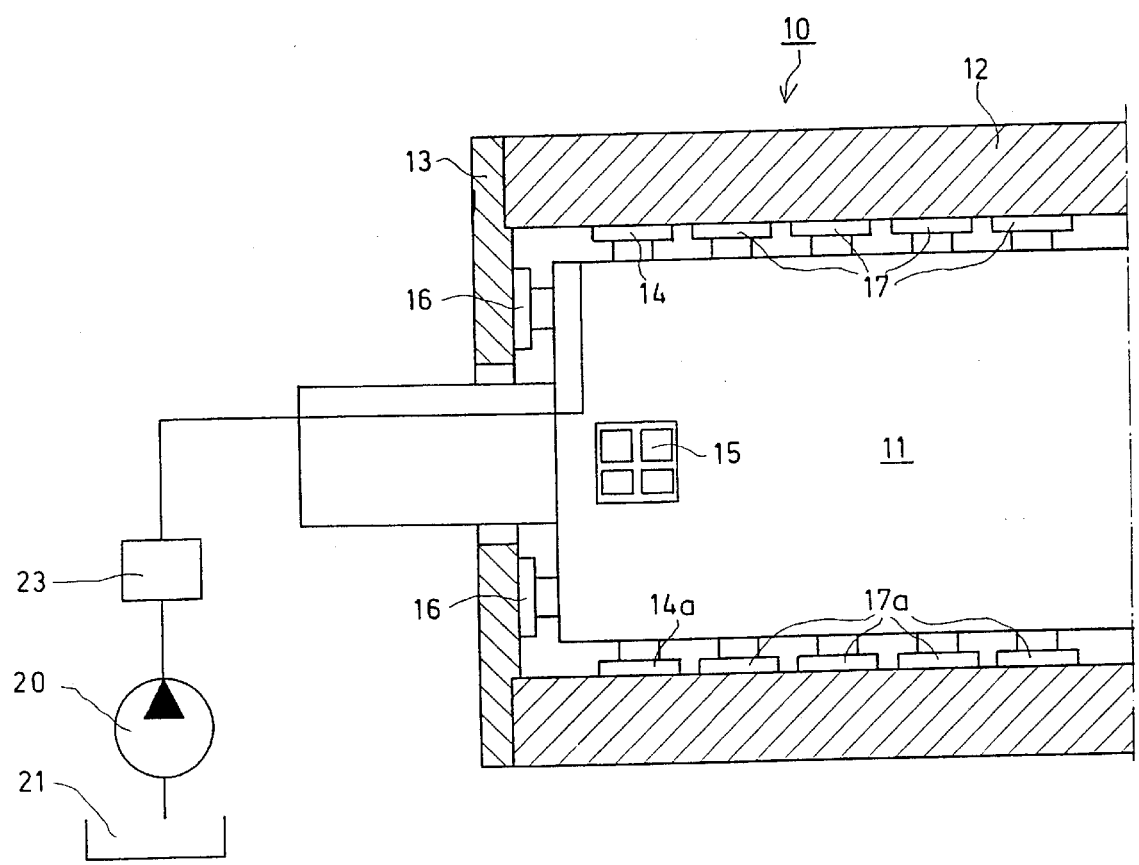
FIG. 4 is an illustration similar to FIG. 3 of a second embodiment in which the method in accordance with the invention can be applied.

FIG. 4 Shows an embodiment of the invention in which additional fluid is fed to the end areas of the roll into the space between the roll mantle 12 and the roll axle 11 through a separate duct. The feed duct through which additional fluid is fed to this space is connected with a regulation device 23, which operates either as a device that regulates the temperature or as a device that regulates the volumetric flow. If the regulation device 23 regulates the temperature, the fluid feed devices 20,21 feed the fluid as of substantially constant volumetric flow. On the other hand, if the regulation device 23 regulates the volumetric flow, the temperature of the additional fluid can be kept substantially constant. Thus in the embodiment of FIG. 4, the regulation of the temperature of the end areas of the roll is carried out by supplying additional fluid to the end areas of the roll and by regulating the temperature or the volumetric flow of the additional fluid.

Figure 5:
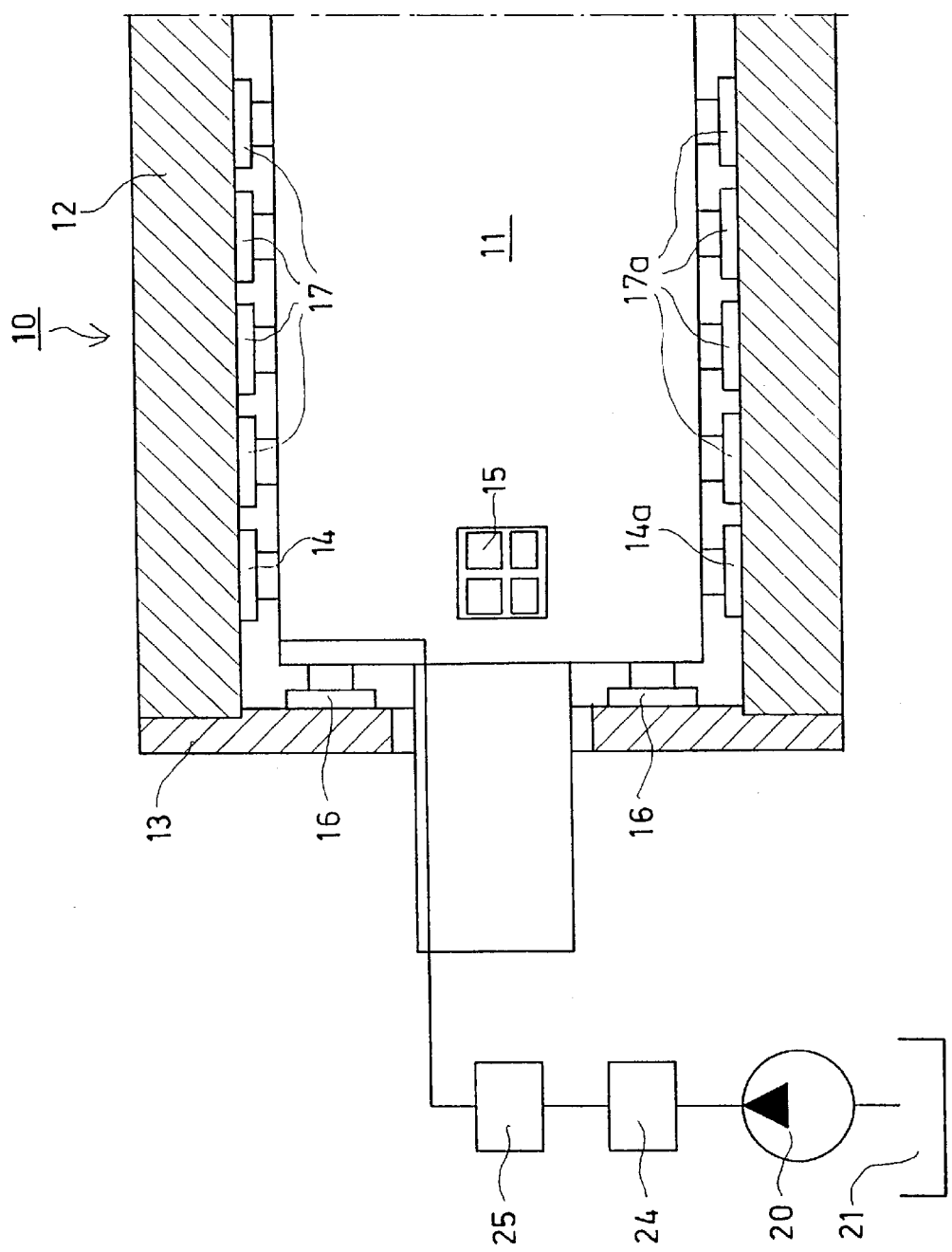
FIG. 5 is an illustration similar to FIGS. 3 and 4 of a third embodiment in which the method in accordance with the invention can be applied.

The embodiment shown in FIG. 5 is in most respects similar to the embodiment shown in FIG. 4, however, with the exception that the duct for the supply of additional fluid is provided with two regulation devices 24,25. One of the regulation devices 24 can operate, for example, as a device that regulates the temperature only, whereas, by means of the other regulation device 25, only the volumetric flow of the additional fluid is regulated. Thus, in the embodiment of FIG. 5, in view of regulation of the temperature in the end areas of the roll 10, both the temperature and the volumetric flow of the additional fluid are regulated. A single regulation device could also be designed with both of these functions.

Figure 6:
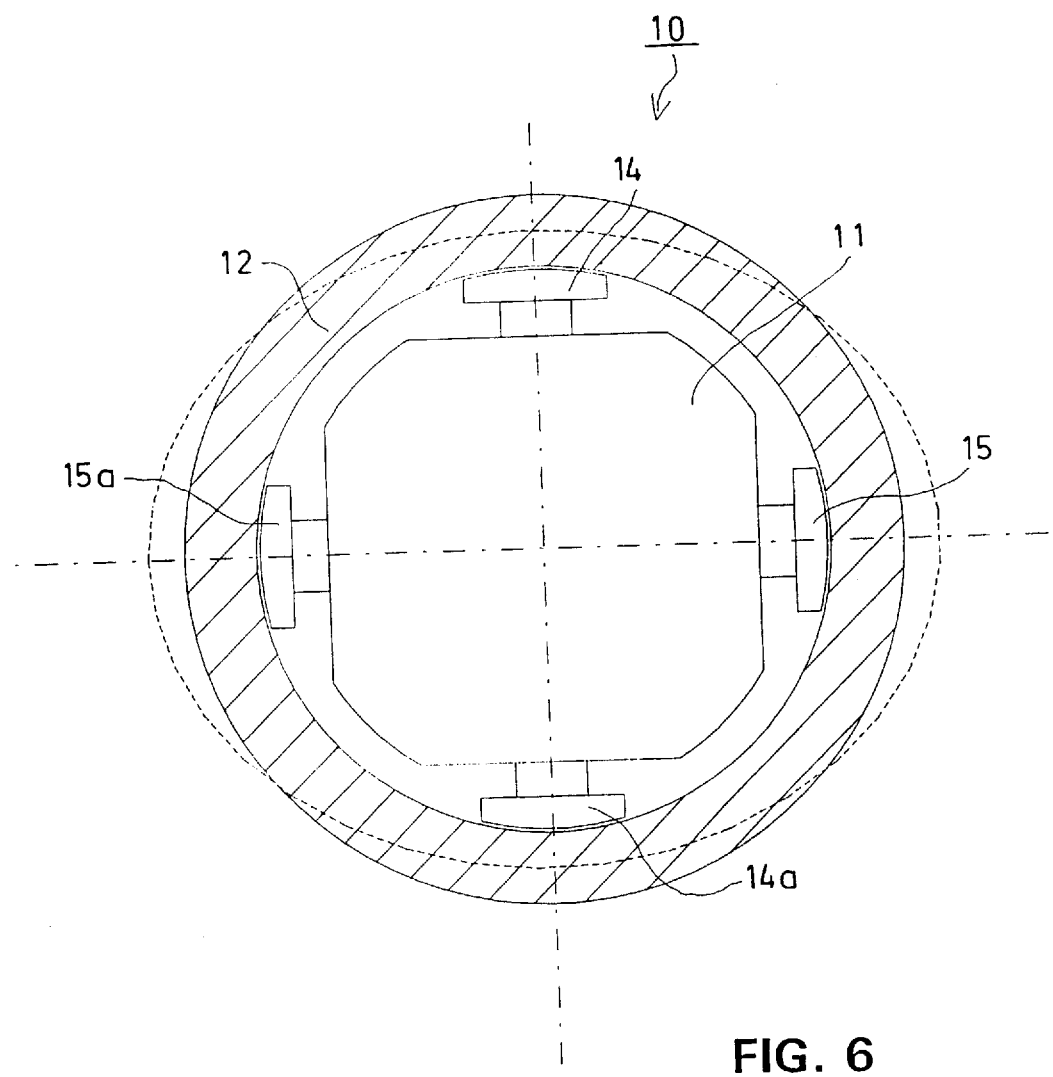
FIG. 6 is a cross-sectional view of a fourth embodiment in which the method in accordance with the invention can be applied.

FIG. 6 shows a further embodiment of the invention. In the embodiment of FIG. 6, the temperature of the end of the roll mantle is not regulated, but in this construction the error in the shape of the roll mantle arising from thermal expansion of the roll mantle is regulated, which error again causes a fault in the nip profile. As explained above, the ends of the roll 10 become hotter than the rest of the roll whereby, owing to thermal expansion, the diameter of the roll mantle 12 becomes larger and produces a fault in the nip profile. In the embodiment shown in FIG. 6, this fault arising from thermal expansion has been compensated for and eliminated so that the roll mantle 12 is spread by means of the glide bearing elements 15,15a acting in the direction transverse to the nip plane. This spreading of the roll mantle is illustrated in FIG. 6 schematically and with abundant exaggeration by means of dashed lines. As seen in FIG. 6, when the roll mantle 12 is spread in the transverse direction, its diameter is, of course, reduced in the direction of the nip plane, in which case, by means of a suitable spreading force, the diameter of the roll mantle in the nip plane can be kept equal across the entire axial length of the roll mantle. In other words, the error arising from thermal expansion can be compensated for.

In the regulation of the temperatures in the end areas of the roll 10 mantle and in compensating for the error arising from thermal expansion, it is, of course, possible to use various combinations of the embodiments described above. In different embodiments of the invention, the quantities, i.e. the volumetric flows and/or the temperatures of the fluid fed to the end areas of the roll 10 and/or to the glide bearing elements 14,14a,15,16 and so also the force necessary in order to spread the roll mantle 12 can be calculated in advance from case to case. By means of the embodiments described above or by means of combinations of these embodiments, the problems arising from the temperatures in the end areas of the mantle of the roll provided with glide bearings can be brought under control, and these temperatures and the problems arising from them can be controlled smoothly in most varying situations of operation.

The examples provided above are not meant to be exclusive. Many other variations of the present invention would be obvious to those skilled in the art, and are contemplated to be within the scope of the appended claims. For example, although it is described above that the glide bearing elements operate with oil to provide an oil film, it is also possible to use another comparable pressure medium in connection with the glide bearing elements.

We claim:

1. A method for regulating the temperature in end areas of a roll mantle of a variable-crown roll provided with glide bearings and/or for compensating for an error in the diameter of the roll arising from thermal expansion in a roll, the roll including a roll axle and hydraulic loading elements mounted on the roll axle for adjustably supporting a middle area of the roll mantle on the roll axle, the hydraulic loading elements acting on an inner face of the roll mantle under hydraulic pressure provided by a pressure medium, the middle area of the roll mantle defining a web-contacting area situated between the end areas of the roll mantle and over which the web is adapted to run while the end areas of the roll mantle each define a non-web-contacting area over which the web is not adapted to run, the method comprising the steps of:

mounting hydraulic glide bearing elements on the roll axle for supporting the end areas of the roll mantle, the glide bearing elements acting on the inner face of the roll mantle, supplying a fluid into end areas of the roll between the roll axle and the end areas of the roll mantle, and regulating the temperature and/or flow of the fluid being supplied into the end areas of the roll such that the temperature in the end areas of the roll mantle is regulated.

2. The method of claim 1, wherein the temperature and/or flow of the fluid being supplied into the end areas of the roll is regulated such that the temperature in the end areas of the roll mantle is substantially the same as the temperature in the middle area of the roll mantle.

3. The method of claim 1, wherein the roll forms a nip with another press roll, further comprising the step of:

arranging the hydraulic loading elements to act in a direction of a nip plane defined as a plane extending between a center axis of the roll and a center axis of the press roll and through the nip.

4. The method of claim 1, wherein said step of supplying the fluid into the end areas of the roll comprises the step of:

directing the fluid into the glide bearing elements arranged in the end areas of the roll mantle, the fluid passing from the glide bearing elements into a space between the roll axle and the roll mantle in the end areas of the roll such that the fluid operates as a pressure medium that produces hydraulic loading of the glide bearing elements.

5. The method of claim 1, wherein said step of supplying the fluid into the end areas of the roll comprises the step of:

passing the fluid directly from a source thereof into a space defined between the roll axle and the end areas of the roll mantle to act directly upon the inner face of the roll mantle.

6. The method of claim 1, further comprising the step of:

determining the temperature of the fluid supplied to the end areas of the roll in accordance with the running speed and loading situation of the roll.

7. The method of claim 1, wherein the temperature of the fluid being supplied into the end areas of the roll is regulated as stepwise variable based on the running speed of the roll.

8. The method of claim 1, further comprising the step of:

passing the fluid through a heat exchanger before the fluid is supplied to the end areas of the roll to thereby enable adjustment of the temperature of the fluid.

9. The method of claim 1, further comprising the step of:

passing the fluid through a flow regulator prior to the fluid being supplied to the end areas of the roll to thereby enable adjustment of the flow of the fluid.

10. The method of claim 9, further comprising the step of:

passing the fluid through a heat exchanger before the fluid is supplied to the end areas of the roll to thereby enable adjustment of the temperature of the fluid.

11. The method of claim 1, wherein said glide bearing elements comprise hydraulic loading shoes, further comprising the steps of:

directing the fluid into the hydraulic loading shoes, the fluid passing from the hydraulic loading shoes into the space between the roll axle and the roll mantle at the end areas of the roll such that the fluid operates as a pressure medium that produces loading of the hydraulic loading shoes, and regulating the volumetric flow of the fluid passing through the hydraulic loading shoes to be substantially constant.

12. The method of claim 1, further comprising the step of:

arranging a first set of the glide bearing elements to act in a direction transverse to a loading direction of the hydraulic loading elements.

13. The method of claim 1, further comprising the steps of:

arranging a first set of the glide bearing elements to act in a loading direction of the hydraulic loading elements, and arranging a second set of the glide bearing elements to act in a direction transverse to the loading direction of the hydraulic loading elements.

14. An apparatus for regulating the temperature in end areas of a roll mantle of a variable-crown roll provided with glide bearings and/or for compensating for an error in the diameter of the roll arising from thermal expansion in a roll, the roll including a roll axle and hydraulic loading elements mounted on the roll axle for adjustably supporting a middle area of the roll mantle on the roll axle, the hydraulic loading elements acting on an inner face of the roll mantle under hydraulic pressure provided by a pressure medium, the middle area of the roll mantle defining a web-contacting area situated between the end areas of the roll mantle and over which the web is adapted to run while the end areas of the roll mantle each define a non-web-contacting area over which the web is not adapted to run, the apparatus comprising:

hydraulic glide bearing elements mounted on the roll axle for supporting the end areas of the roll mantle on the roll axle, the hydraulic glide bearing elements acting on the inner face of the roll mantle, supply means for supplying a fluid into end areas of the roll between the roll axle and the end areas of the roll mantle, and regulating means coupled to said supply means for regulating the temperature and/or flow of the fluid being supplied into the end areas of the roll such that the temperature in the end areas of the roll mantle is regulated.

15. The apparatus of claim 14, wherein said supply means comprise a storage reservoir of the fluid and ducts for passing the fluid from said storage reservoir through said regulating means and into the glide bearing elements arranged in the end areas of the roll, the fluid passing from the glide bearing elements into the space between the roll axle and the roll mantle at the end areas of the roll such that the fluid operates as a pressure medium that produces hydraulic loading of the glide bearing elements.

16. The apparatus of claim 14, wherein said supply means comprise a storage reservoir of the fluid and ducts for passing the fluid from said storage reservoir through said regulating means directly into the end areas of the roll between the roll axle and the roll mantle in the end areas of the roll.

17. The apparatus of claim 14, wherein said regulating means comprise a heat exchanger which regulates the temperature of the fluid.

18. The apparatus of claim 14, wherein said regulating means comprise a flow regulator which regulates the flow of the fluid.

19. The apparatus of claim 18, wherein said regulating means further comprise a heat exchanger which regulates the temperature of the fluid.

20. The apparatus of claim 14, wherein the hydraulic loading elements are oriented in a loading direction and a first set of the glide bearing elements is arranged to act in a direction transverse to a loading direction of the hydraulic loading elements.

21. The method of claim 12, further comprising the step of:

spreading the roll mantle in the direction transverse to the loading direction of the hydraulic loading elements by controlling the flow of the fluid to the first set of glide bearing elements such that a diameter of the roll mantle at the end areas of the roll in the loading direction is reduced and an error in the diameter of the roll mantle arising from the temperature of the roll mantle at the end areas of the roll mantle is obviated.

22. The method of claim 1, wherein the roll includes roll ends each arranged at a respective axial end of the roll mantle between the roll mantle and the roll axle, further comprising the step of:

mounting additional glide bearing elements on the roll axle to act on an inner face of each roll end of the roll.

23. The method of claim 22, further comprising the step of:

directing a fluid into the additional glide bearing elements such that the fluid passes from the additional glide bearing elements into a space between the roll axle and the roll ends.

24. The apparatus of claim 20, wherein a second set of the glide bearing elements is arranged to act in the loading direction of the hydraulic loading elements.

25. The apparatus of claim 14, wherein the roll includes roll ends each arranged at a respective axial end of the roll mantle between the roll mantle and the roll axle, the apparatus further comprising additional glide bearing elements mounted on the roll axle to act on an inner face of each of the roll ends.

26. The apparatus of claim 25, wherein said supply means are arranged to supply fluid to spaces between the roll mantle and the roll ends through said additional glide bearing elements.

27. A method for regulating the temperature in end areas of a roll mantle of a variable-crown roll provided with glide bearings and/or for compensating for an error in the diameter of the roll arising from thermal expansion in a roll, the roll including a roll axle, roll ends each arranged at a respective axial end of the roll mantle between the roll mantle and the roll axle and hydraulic loading elements mounted on the roll axle for adjustably supporting a middle area of the roll mantle on the roll axle, the hydraulic loading elements acting on an inner face of the roll mantle under hydraulic pressure provided by a pressure medium, the middle area of the roll mantle defining a web-contacting area situated between the end areas of the roll mantle and over which the web is adapted to run while the end areas of the roll mantle each define a non-web-contacting area over which the web is not adapted to run, the method comprising the steps of:

mounting hydraulic glide bearing elements on the roll axle for supporting at least one of the end areas of the roll mantle and the roll ends relative to the roll axle, supplying a fluid into end areas of the roll, and regulating the temperature and/or flow of the fluid being supplied into the end areas of the roll such that the temperature in the end areas of the roll is regulated.

28. The method of claim 27, wherein the glide bearing elements are mounted on the roll axle for supporting the end areas of the roll mantle such that the glide bearing elements act on an inner face of the roll mantle.

29. The method of claim 27, wherein the glide bearing elements are mounted on the roll axle for supporting the roll ends.

30. An apparatus for regulating the temperature in end areas of a roll mantle of a variable-crown roll provided with glide bearings and/or for compensating for an error in the diameter of the roll arising from thermal expansion in a roll, the roll including a roll axle, roll ends each arranged at a respective axial end of the roll mantle between the roll mantle and the roll axle and hydraulic loading elements mounted on the roll axle for adjustably supporting a middle area of the roll mantle on the roll axle, the hydraulic loading elements acting on an inner face of the roll mantle under hydraulic pressure provided by a pressure medium, the middle area of the roll mantle defining a web-contacting area situated between the end areas of the roll mantle and over which the web is adapted to run while the end areas of the roll mantle each define a non-web-contacting area over which the web is not adapted to run, the apparatus comprising:

hydraulic glide bearing elements mounted on the roll axle for supporting at least one of the end areas of the roll mantle and the roll ends relative to the roll axle, supply means for supplying a fluid into end areas of the roll, and regulating means coupled to said supply means for regulating the temperature and/or flow of the fluid being supplied into the end areas of the roll such that the temperature in the end areas of the roll is regulated.

31. The apparatus of claim 30, wherein the glide bearing elements are mounted on the roll axle for supporting the end areas of the roll mantle such that the glide bearing elements act on an inner face of the roll mantle.

32. The apparatus of claim 30, wherein the glide bearing elements are mounted on the roll axle for supporting the roll ends.

* * * * *